Oct. 23, 1928.
C. C. SPREEN
COMPRESSOR
Filed Nov. 6, 1924
1,688,884
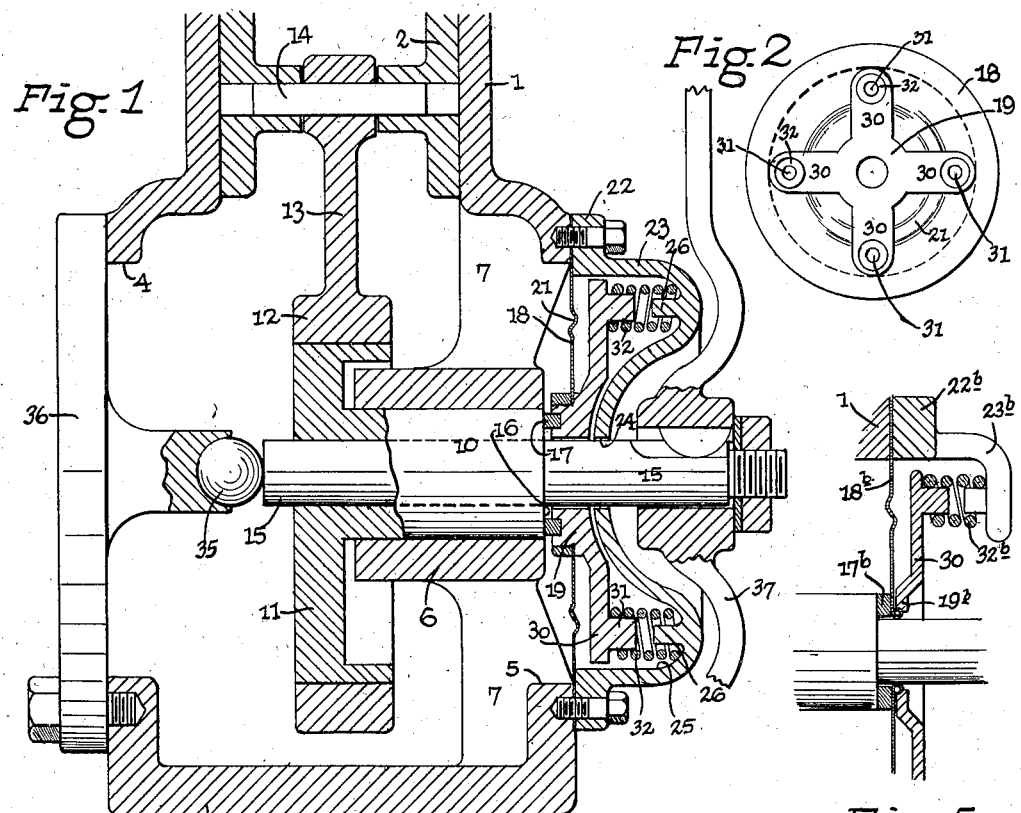
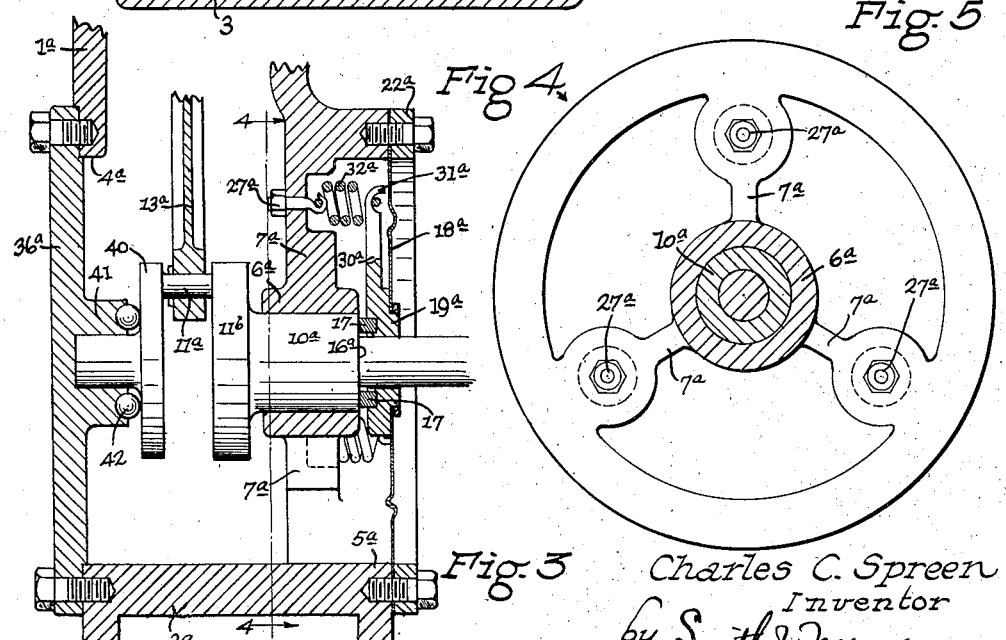
Charles C. Spreen
Inventor
by Smith & Freeman
Attorneys Patented Oct. 23, 1928.

1,688,884

UNITED STATES PATENT OFFICE.

CHARLES C. SPREEN, OF DETROIT, MICHIGAN, ASSIGNOR, BY MESNE ASSIGNMENTS, TO KELVINATOR CORPORATION, OF DETROIT, MICHIGAN, A CORPORATION OF MICHIGAN.

COMPRESSOR.

Application filed November 6, 1924. Serial No. 748,069.

This invention relates to refrigerating machinery and has special reference to a compressor for use therein. The objects of the invention are the provision of new, simplified, and cheapened compressor for this purpose; the provision of a compressor having an improved and simplified type of bearing provision which is easily and cheaply manufactured and free from faults in alignment; the provision of a new and improved type of sealing device which is cheaper and more economical than other devices; the provision of a sealing device which is free from any tendency to become tilted sidewise; the provision of a compressor wherein only one shaft bearing is employed and which can be operated before closing the crank case; while further objects and advantages of the invention will become apparent as the description proceeds.

In the drawings accompanying and forming a part of this application I have shown certain simple forms in which my inventive idea can be embodied. Fig. 1 is a vertical sectional view through a compressor embodying my improvements; Fig. 2 is a detail view of the diaphragm and its spider; Fig. 3 is a sectional view through a modified form of compressor; Fig. 4 is a detail view corresponding to the line 4—4 of Fig. 3; and Fig. 5 shows a modified form of construction.

For purposes of illustration I have shown a single cylinder compressor wherein 1 indicates the cylinder, 2 the piston and 3 a crank case integral with the cylinder and having openings 4, 5, on opposite sides. Inside the crank case is a cylindrical bearing member 6 spaced from the walls by means of integral arms 7—7, this bearing located entirely within the space defined by the openings 4 and 5 and mostly to one side of the center line of the piston 2. Journaled in the bearing 6 is the device which I here term the crank member, although in some cases I enlarge the diameter of the crank pin so as to overlap the center of the shaft thus producing that specific variety of crank known as an eccentric. In Fig. 1 I have shown the crank member as consisting of a cast iron hub 10 integral with an eccentric 11 with which co-operates an eccentric strap 12 integral with the connecting rod 13 journaled to the wrist pin 14. In case the bearing 6 extends sufficiently far into the casing, the eccentric is hollowed out to accommodate the same. Preferably the driving shaft consists of a piece of cold rolled steel shafting 15 cast in the hub 10 and projecting from both ends thereof.

The rotatable member is formed with an outwardly facing shoulder 16 for engagement with the sealing ring 17, which is made of some kind of antifriction metal adapted to make non-leaking contact with both the hubs. There are numerous graphite bronzes on the market which are extremely satisfactory for the purpose such as that set forth in U. S. Letters Patent of E. J. Copeland No. 1,329,348 issued January 27, 1920, although common Babbitt metal and other similar compositions can be used. This ring is non-leakably secured to a flexible sheet metal diaphragm 18. In the construction shown in Fig. 1 this securing is effected through the agency of a hub 19 which in turn is non-leakably secured to the diaphragm 18. This diaphragm is preferably circular in shape as shown in Fig. 2 and is best formed with one or more circumferential corrugations 21 to increase the elasticity in an axial direction while reducing the tendency to warp or twist. Its margin is tightly clamped to the face of the crank case surrounding the aperture 5, being gripped beneath the rim 22 of a cap member 23. This member is formed with a central aperture 24 for the free passage of the shaft 15, and is bowed outwardly intermediate its rim and center to form an annular recess 25. Located at angularly spaced intervals in this recess are spring attachment members 26, here shown as integral bosses adapted to project into the springs. The hub 19 is formed with spaced radial arms 30 equal in number to these spring attachments and formed at their ends with companion spring bosses 31 between which and the first named bosses are interposed the spiral springs 32 which force the ring 17 against the shoulder 16 with uniform pressure. The consequent end thrust of the shaft is received by a suitable bearing, such for example as the hardened ball 35 carried by the closure plate 36 which covers the opening 4. A suitable drive wheel 37 is secured to the projecting end of the shaft in any suitable manner as by key and nut.

In Fig. 3 I have shown an alternative form of the invention including a cylinder 1$^a$ and crank case 3$^a$ having openings 4$^a$ and 5$^a$ and also having an internal bearing 6$^a$ carried by integral arms 7$^a$. The crank member consists as before of a hub 10ª and eccentric 11ª excepting that the latter instead of being large, is shown as constituting a crank pin carried by the disk 11ᵇ and articulated to the connecting rod 13ª. The shoulder 16ª and ring 17 appear as before, also the hub 19ª and diaphragm 18ª; but the springs 32ª are made tension springs instead of compression springs being secured at their inner ends to attachment members consisting of hook bolts 27ª carried by the arms 7ª and having their outer ends attached to the fingers 31ª with which the arms 30ª are provided. The diaphragm 18ª is clamped to the crank case by a suitable ring 22ª. In this case I have shown the exterior face of the diaphragm as entirely naked; the diaphragm of Fig. 1 can likewise be left uncovered except for such arms as to carry the spring seats.

In case a crank is used as shown in Fig. 3 it is necessary to adopt suitable expedients for taking up the end thrust, one such expedient consisting of a suitable disk 40 journaled in a boss 41 carried by the plate 36ª which closes the opening 4ª. A ball bearing 42 can be employed if desired to reduce friction. In any case the hub 19 is preferably formed to overlap the end of the bearing member 6 and is preferably spaced only a short distance therefrom so that the diaphragm will not be seriously distorted nor the parts substantially displaced upon the removal of the thrust bearing thus avoiding injury upon careless removal and also permitting the machine to be operated without the thrust bearing. The flat diaphragm herein shown is much less expensive than a cylindrical diaphragm, while the single bearing herein shown is much easier to construct than a device having plural bearings which have to be kept in line. The plural springs also exert a uniform pressure on the sealing ring. The crank member is most cheaply made by being cast about the drive shaft and the iron to iron bearing thereby formed is entirely satisfactory for low speeds and moderate pressures, especially since the construction permits the parts to be plentifully bathed in oil.

In Fig. 5 I have shown the ring 17ᵇ as secured directly to the diaphragm 18ᵇ, and the pressure as applied through a sheet metal plate 30ᵇ having a central hub portion 19ᵇ engaging the diaphragm but not fastened thereto, the springs being carried by short arms 23ᵇ which project from the ring 22ᵇ. It will be understood that many changes in details can be made; for example the arms 30 need not be separate from each other, the sealing ring need not be separate from the hub but the entire hub can be made of sealing ring composition, the arms 7 can be made as large as one chooses and the holes between as small or entirely omitted, the arms need not be integral with the casing, the back side of the casing can be made imperforate, the thrust bearing can be located elsewhere than on the closure plate in case the latter is used, the cylinders need not be integral with the crank casing, etc. Also, I do not limit my improved sealing diaphragm to use with a single bearing compressor nor my single bearing to use with this particular form of diaphragm nor do I limit myself to any other details herein described except as the same are specifically recited in my several claims.

Having thus described my invention what I claim is:

1. In a rotating shaft seal, the combination with a casing having an aperture, a bearing within said casing supported by spaced arms integral with the casing, and a shaft having a reduced portion forming a shoulder, the reduced portion of said shaft extending through the aperture in said casing; of a seal structure comprising an annular resilient corrugated diaphragm, a cap member for securing said diaphragm to said casing adjacent the periphery of the opening therein, anti-friction means including a spider having a hub portion and spaced arms projecting therefrom, for engaging the shoulder of said shaft, and means disposed between said cap member and said spider for maintaining said spider in positive engagement with said shaft.

2. In a rotating shaft seal, the combination with a casing having an aperture, and a shaft having a reduced portion forming a shoulder, the reduced portion of said shaft extending through the aperture in said casing; of a seal structure comprising an annular resilient corrugated diaphragm, a cap member for securing said diaphragm to said casing adjacent the periphery of the opening therein, said cap member having an aperture and being formed to provide an annular recessed portion, bosses at regularly spaced intervals in the recessed portion of said cap member and integral therewith, anti-friction means including a spider having a hub portion and spaced arms projecting radially therefrom, and means engaging said bosses and said spider for maintaining said anti-friction means in positive sealing engagement with said shaft.

3. In a rotating shaft seal, the combination with a casing having an aperture, a bearing within said casing spaced therefrom and integral therewith, and a shaft having a reduced portion forming a shoulder, the reduced portion of said shaft extending through the aperture in said casing; of a seal structure comprising an annular resilient corrugated diaphragm, a cap member having an aperture and formed to provide an annular recessed portion, bosses at regular intervals in the recessed portion of said cap member and integral therewith, a spider having a hub portion and spaced arms projecting radially therefrom, said hub portion having a groove in the side facing the shoulder of said shaft, and provided with means for detachably securing said diaphragm to said hub, bosses integral with said arms to cooperate with the bosses in said cap member, a ring of antifriction material secured in the groove in said hub for sealing said spider against the shoulder of said shaft, and springs engaging each pair of cooperating bosses to maintain said ring in frictional sealing engagement with the shoulder of said shaft.

In testimony whereof, I hereunto affix my signature.

CHARLES C. SPREEN.